Dec. 1, 1931.   G. D. BRADSHAW   1,834,086
FLUID SEPARATOR
Filed June 3, 1929

INVENTOR:
Grant D. Bradshaw
By E. J. Andrews
Atty.

Patented Dec. 1, 1931

1,834,086

UNITED STATES PATENT OFFICE

GRANT D. BRADSHAW, OF BEAVER, PENNSYLVANIA, ASSIGNOR TO BLAW-KNOX COMPANY, OF BLAWNOX, PENNSYLVANIA, A CORPORATION OF NEW JERSEY

FLUID SEPARATOR

Application filed June 3, 1929. Serial No. 367,859.

This invention relates to fluid separators, and particularly to those used for purifying gases, such as steam, by separating from the gases liquid particles and other impurities. It has for one of its objects providing means for increasing the efficiency and capacity of the separators by reducing the tendency of the water chambers and passageways of the separator to overflow or become clogged, and a particular object is to provide improved means for the passage of air, steam or other gases, from the water passageways and pipes and collecting chambers, so as to prevent interference with the free flow of the water or other liquids.

Although the invention is applicable to various types of separators used for various purposes, yet, for the purpose of illustrating my invention, I have described it as applied to steam separators used for drying and purifying the steam in boilers, and, particularly, to that type of separator known by the trade as "Tracyfiers".

Figure 1:
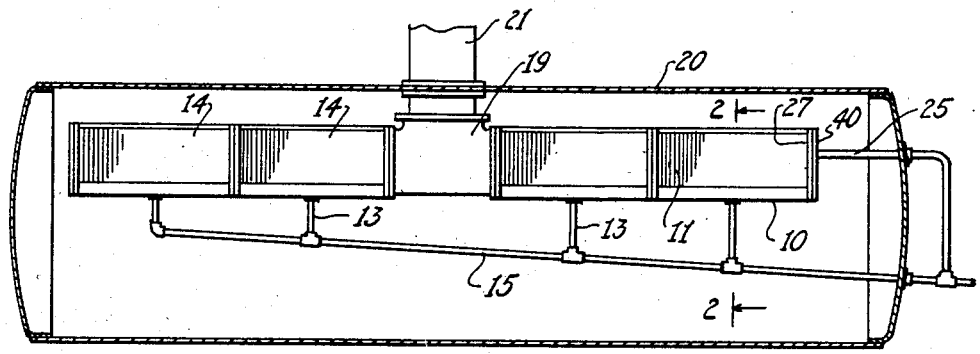
Figures 2, 3:
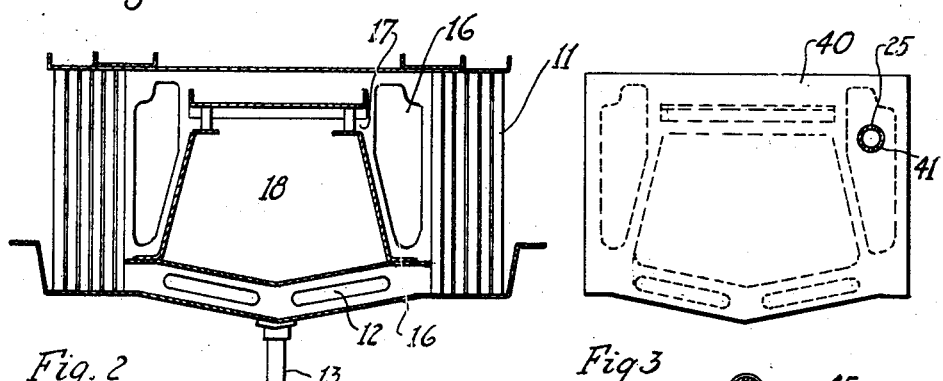
Figure 4:
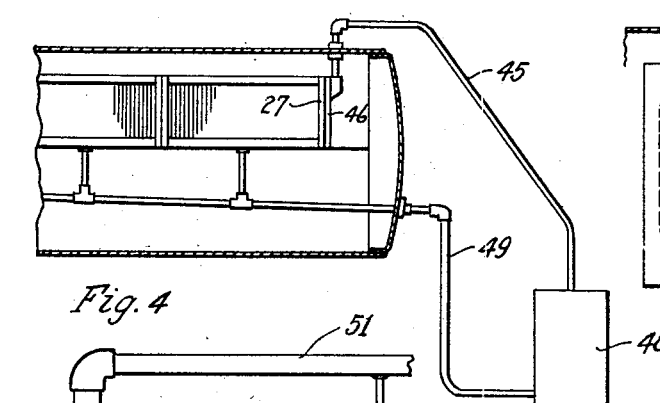
Figure 5:
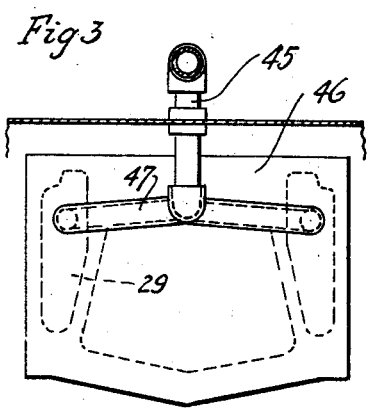
Figure 6:
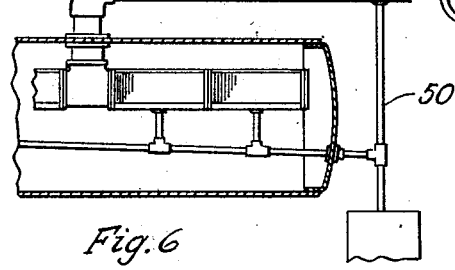

Of the accompanying drawings, Fig. 1 is an elevation of a separator mounted in a boiler, which embodies the features of my invention; Fig. 2 is an enlarged transverse sectional view of the separator along the line 2—2 of Fig. 1; Fig. 3 is an elevation of one of the end plates of one of the sections of the separator; Fig. 4 is a fractional elevation of a separator in a boiler, showing a modification of my invention; Fig. 5 is an enlarged elevation of the end plate of the separator of Fig. 4; Fig. 6 is an elevation of another modification.

This application is a continuation in part of my copending application Serial No. 211,286, filed August 8, 1927.

The separator which I have illustrated in describing my invention comprises a casing 10 which is open on the sides and has positioned in the side openings baffles 11. The steam which is to be purified passes through these baffles and the moisture contained therein passes downwardly into the water passageway 12 and thence into a drain pipe 13. Ordinarily, the separator comprises a number of sections 14, each arranged as hereinabove described, and each having a drain pipe 13 which communicates with the manifold drain pipe 15. The water in this pipe is ordinarily carried outside of the boiler and disposed of in any suitable manner.

The steam passing through the baffles 11 enters a steam chamber 16 and from this chamber passes through inlets 17 into an inner conduit 18 from which it flows to the outlet T 19 of the boiler 20 and, thence, to the steam main 21 of the boiler system.

My invention consists in providing means for preventing air or steam from clogging up the drain pipes 13 or 15 or the steam trap to which the water is delivered. For this purpose, a vent pipe 25 is provided which connects with the drain pipe system either directly to the manifold 15 or to the trap to which the water is delivered by the manifold. This vent pipe is connected to the steam passageway 16 of the separator. In this case, a blank end plate 40 is fixed to the ordinary end plate 27. This additional end plate 40 has an opening 41 therein, into which is threaded the vent pipe 25. In this manner, steam or air is free to pass directly from the manifold 15 into one of the steam passageways 16, and thus into the steam chamber 18 of the separator section.

Figs. 4 and 5 illustrate a modification of my invention. In this case, the vent pipe 45 enters from the upper side of the boiler and passes down into an end plate 46 which has a forked passageway 47 communicating with both of the steam passageways 29 in the section end plate 27. This shows the vent pipe 45 connected to the trap 48, to which the manifold drain pipe 49 delivers the water separated from the steam.

Fig. 6 illustrates another modification in which the vent pipe 50 enters the steam main 51 of the boiler. This arrangement is desirable when the conditions require a greater drop in pressure through the drain and bent pipes than is obtained by connecting the vent pipe with the steam or water chambers of the purifier.

Although I have illustrated and described two end plates 27 and 40, Figs. 1 to 5, in forming the communicating passageways of the separator, yet, it is to be understood that these two plates could be made integral or that modifications could be formed with a single thickness plate; and other modifications could be made in the various details which I have set forth, by those skilled in the art, without departing from the spirit of my invention as set forth in the following claims.

I claim as my invention:

1. A fluid separator comprising a water chamber and a steam chamber, a drain pipe communicating with said water chamber, an end plate mounted on one end of the separator and having two openings therethrough communicating with said steam chamber, a second end plate having a forked passageway therein, said second plate being fixed to said first mentioned plate with the branches of the forked passageway communicating with the respective openings in said first mentioned plate, and means providing communication between said drain pipe and said forked passageway.

2. A fluid separator as claimed in claim 1, in which a portion of said forked passageway is elevated above said two openings.

3. A fluid separator comprising a water chamber and a steam chamber, a drain pipe connected with said water chamber, an end plate mounted on one end of the separator and having an opening therethrough, said opening communicating with said steam chamber, and means operatively communicating with said opening and said drain pipe.

4. A fluid separator comprising a water chamber and a steam chamber, means closing one end of said steam chamber and having an opening therethrough, a drain pipe communicating with said water chamber, a vent pipe communicating with said opening, and communicating means connecting said two pipes.

5. A fluid separator comprising a plurality of sections, connecting means between the adjacent ends of two adjacent sections, said sections and connecting means having communicating water passageways and communicating steam passageways, communicating drain pipe connected respectively with all of said passageways, and a vent pipe connecting said drain pipe with one of said steam passageways.

In testimony whereof, I hereunto set my hand.

GRANT D. BRADSHAW.